United States Patent [19]

Mason

[11] Patent Number: 4,607,773
[45] Date of Patent: Aug. 26, 1986

[54] VEHICLE MOUNTED LONG ARTICLE CARRYING UTILITY BRACKET WITH ADJUSTABLE CROSS BAR

[76] Inventor: Thomas A. Mason, 3022 Castle Rock, Garland, Tex. 75042

[21] Appl. No.: 802,718

[22] Filed: Nov. 27, 1985

Related U.S. Application Data

[63] Continuation-in-part of Ser. No. 613,431, May 24, 1984, abandoned.

[51] Int. Cl.$^4$ .............................................. B60R 9/02
[52] U.S. Cl. ............................. 224/42.45 R; 224/273
[58] Field of Search ......... 224/42.45 R, 273, 42.03 R, 224/309, 329, 42.31, 42.42, 42.43

[56] References Cited

U.S. PATENT DOCUMENTS

| | | | |
|---|---|---|---|
| 2,302,300 | 11/1942 | Davies | 224/273 |
| 2,425,629 | 8/1947 | Mayer | 224/42.45 R |
| 3,291,427 | 12/1966 | Hutchings | 224/42.45 R |
| 4,007,864 | 2/1977 | Hreha | 224/42.43 |

Primary Examiner—Stephen Marcus
Assistant Examiner—David Voorhees
Attorney, Agent, or Firm—Warren H. Kintzinger

[57] ABSTRACT

A utility bracket with an adjustable cross bar used to haul articles and merchandise normally too long to fit inside a vehicle. The brackets are "S" shaped brackets formed of rod or tubing with a resilient tubular pad thereon through substantially the length of one of the loops of each bracket. The utility brackets are designed primarily for use by pairs mounted on a vehicle with the padded loops thereof extended, respectively, through the two passenger side windows of a four door car, through a window and over a side edge of a trunk, or a passenger side window and the side edge of the bed of a truck. The cross bar on each bracket is adjustable to adapt to substantially any car outer side contour with the cross bar adjustable vertically and horizontally to distribute weight laterally. The cross bar is also padded with resilient tubular padding to protect a car's outer finish.

14 Claims, 5 Drawing Figures

U.S. Patent    Aug. 26, 1986    4,607,773
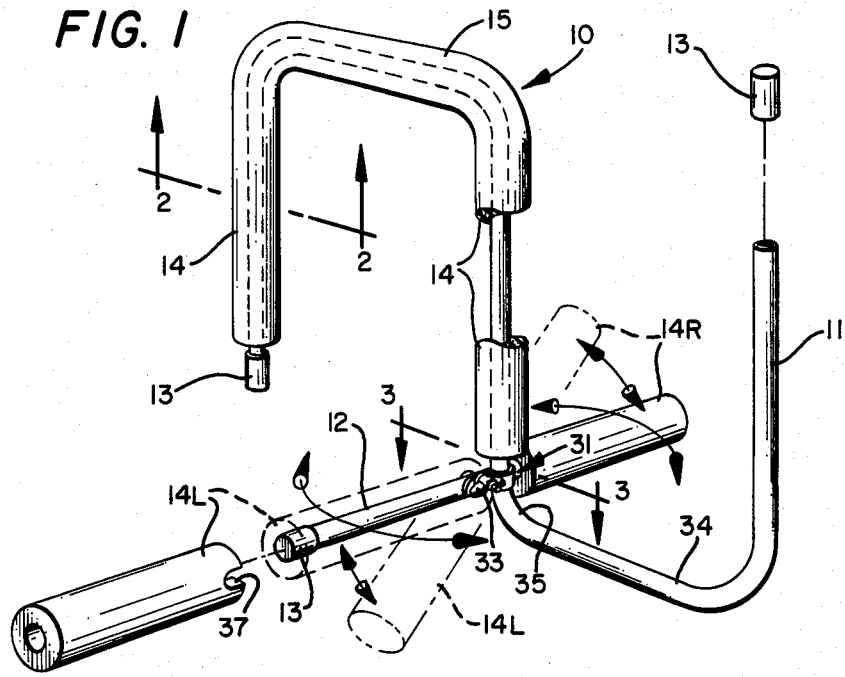
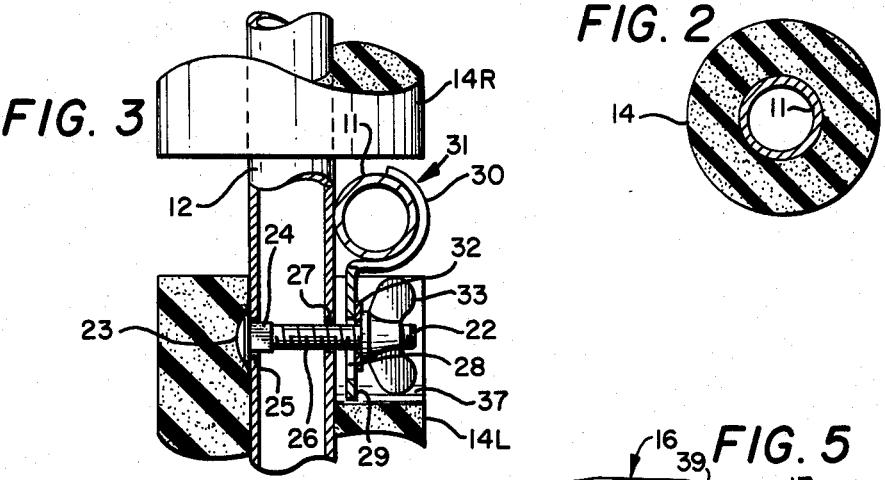
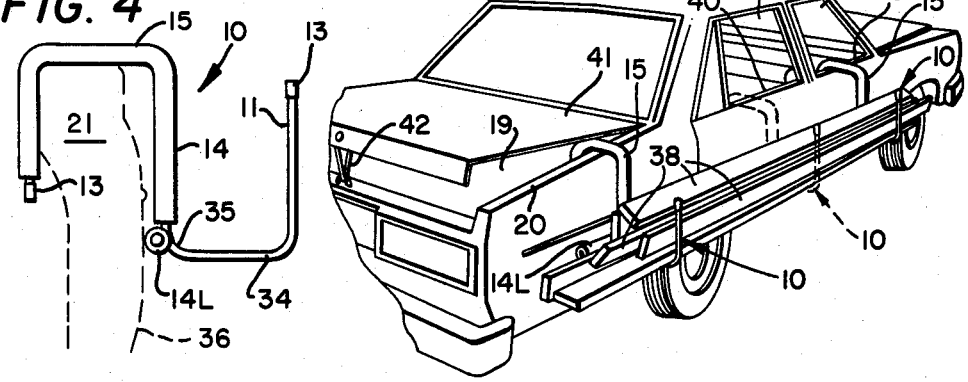

VEHICLE MOUNTED LONG ARTICLE CARRYING UTILITY BRACKET WITH ADJUSTABLE CROSS BAR

This is a continuation-in-part of my co-pending application, Ser. No. 613,431 filed May 24, 1984, now abandoned.

This invention relates in general to article mounting and carrying devices for vehicles, and more particularly, to vehicle mounted long article carrying utility brackets equipped with adjustable cross bars generally used in spaced relation on the passenger side of a vehicle.

Many times there are loads that while relatively light (under one hundred pounds) are awkward to carry by vehicle in that they are too long to be put inside a passenger car or even on the bed, at times of a pick up truck. Further, items too long to fit within a car trunk and carried particularly in the trunk and sticking out to the rear can be quite dangerous and subject to damage in falling from the trunk. Then too, if long items are carried partly within a vehicle and sticking out a window a condition may exist that may not only be dangerous but also a violation of law. Brackets used should be so padded as to protect a car's finish where used.

It is, therefore, a principal object of this invention to provide convenient safe outside mounting of long articles not exceeding the bumper to bumper length of a vehicle mounting long articles.

Another object is to provide such mounting of long articles with a pair of utility brackets equipped with adjustable cross bars easily mounted on a vehicle in seconds.

A further object is to provide such a pair of utility brackets that mount on a vehicle without fixed attachments such as belts, screws or mounting fixtures in place.

Still another object is to provide such mounting of long articles with utility brackets and the bracket cross bars with resilient padding for protecting the vehicle paint finish from damage.

Another object is for bracket cross bars to adjust in distributing support weight laterally.

Features of the invention useful in accomplishing the above objects include, in a vehicle mounted long article carrying utility bracket used in sets of two brackets each, an "S" shaped bracket formed of rod or tubing equipped with an adjustable cross bar. A resilient tubular pad is used on each bracket extending through substantially the length of one of the loops of the bracket and a length of such resilient tubular padding is used on each side of the adjustable cross bar mounted on the bracket. The utility brackets are used primarily with the padded loops thereof extended, respectively, through the two passenger side windows of a four door car, through a window and over a side edge of a trunk, or a passenger side window and the side edge of the bed of a truck with a part of the protective padding of a loop and/or of the adjustable cross bars resting against and protecting the paint finish on the outside of the vehicle.

A specific embodiment representing what is presently regarded as the best mode of carrying out the invention is illustrated in the accompanying drawing.

IN THE DRAWING

FIG. 1 represents a perspective view of the new vehicle mountable long article carrying utility bracket equipped with an adjustable cross bar;

FIG. 2, a cut away and sectioned view along line 2—2 of FIG. 1 showing detail of the resilient tubular pad encased portion of the utility bracket and such as used on opposite sides of the adjustable cross bar;

FIG. 3, a partial cut away and sectioned view showing adjustable mounting detail of an adjustable cross bar on a utility bracket;

FIG. 4, a view of a utility bracket on a vehicle door (shown in phantom) showing how the adjustable cross bar helps support the utility bracket in proper orientation; and FIG. 5, a perspective showing of a four door automobile with a pair of the utility brackets mounted on the passenger side carrying some long pieces of lumber.

REFERRING TO THE DRAWING

The long article carrying utility bracket 10 of FIG. 1 is an "S" shaped bracket formed from round metal tubing 11 equipped with an adjustable tubular cross bar 12 with protective flexible material cup pad ends 13 placed on opposite ends of both the bracket and the cross bar mounted thereon. A resiliently flexible material tubular pad 14 is used on each bracket 10 extending from adjacent one of the cup pad ends 13 at one end of bracket 10 substantially the length of one of the loops of the "S" shaped bracket 10 and lengths 14L and 14R on opposite sides of the cross bar 12. Referring also to FIG. 2 the concentric relation of the tube 11, and tubular pad 14 are shown in cross section through the tubular pad 14 protecting loop 15 of the "S" shaped bracket 10 and in like manner opposite sides of the cross bar 12.

The tubular pad 14 protected loop 15 of each of the "S" shaped utility brackets 10 are generally used in spaced pairs on a vehicle 16, such as shown in FIG. 5, with the tubular pad 14 protected loop 15 extended through a car window 17 resting on the window sill 18 with the window glass rolled down or extending into the car trunk 19 resting on the top of the trunk side edge 20. Referring also to FIG. 4 the adjustable cross bar 12 is shown resting with the tubular padding 14L and 14R bearing against the outer side of a car door 21. The tubular metal cross bar 12 is mounted by a carriage bolt 22 with a short rounded head 33 and a square shank 24 inserted in square hole 25 on the side of the cross bar 12 toward car outer surface the tubular padding 14L and 14R sections set against. The threaded portion 26 of the carriage bolt 22 extends on through opposite side opening 27 of the tubular cross bar 12, elongate opening 28 in the mounting base strap 29 of half loop 30 equipped eccentric clip 31. The carriage bolt 22 continues on through washer 32 and into winged nut 33 which tightens the nut and bolt assembly together and thereby the eccentric clip 31 half loop 30 down on round metal tubing 11 below tubular pad 14 toward the other loop 34 to thereby adjustably mount the cross bar 12 on the utility bracket 10. This mounting permits adjustable movement of the cross bar 12 up and down the metal tubing 11 and even into the tubing bend 35 into loop 34. In addition the mounting permits articulation of the cross bar 12 through ranges of horizontal articulate movement as indicated in FIG. 1 by horizontal arcuate double headed arrows and vertical articulate movement as indicated from the horizontal by phantom images of opposite sides of the padded bar and by vertical arcuate double headed arrows and in an infinite range of arcuate positions therebetween which may be position locked by tightening the winged nut 33. Thus, the cross bar 12 may be adjusted to adapt to substantially any car outer side contour, such as the outer contour of the car door 36 indicated in phantom in FIG. 4, with the cross bar adjustable vertically and horizontally to distribute support weight laterally. It should be noted that the tubular padding 14L section covers the bolt head 23 and is provided with a cut out slit 37 to clear the winged nut 33 on the other side.

The loop 34 of each "S" shaped utility bracket 10 extends outwardly from the passenger side of the vehicle 16 to carry long article loads such as pieces of lumber 38. Long loads could be carried with a pair of "S" shaped utility brackets 10 positioned as shown in FIG. 5 or with one positioned as shown in phantom extending through rear car window 39 resting on the window sill 40 with the window glass rolled down. The brackets 10 could be used on a truck with one extended through a passenger side window and the other supported over the side edge of the bed of the truck with a portion of the protective padding of the loop 15 resting against and protecting the paint finish on the outside of the vehicle. When a bracket 10 is used extending into a car trunk 19 the trunk lid 41 must be tied down with rope or strong twine 42 as shown in FIG. 5.

Once long articles to be carried have been properly placed on a pair of vehicle mounted "S" shaped utility brackets 10 the load should be tied securely with rope or twine to the brackets (detail not shown).

Thus, there is hereby provided a vehicle mounted long article carrying utility bracket with adjustable cross bar of clean design and light weight easy to use in sets of two-window and window or window and trunk. The rugged utility bracket with an adjustable cross bar adapts to substantially any car side contour with padding to protect a car's finish. While steel tubing is used in the utility bracket metal rods could also be used in bracket units easy to use and store and inexpensive for use on up to date cars by the do-it-yourselfer.

Whereas this invention has been described particularly with respect to a single embodiment thereof, it should be realized that various changes may be made without departure from the essential contributions to the art made by the teachings hereof.

I claim:

1. A utility bracket with an adjustable cross bar useable in pairs on a vehicle for carrying long article loads comprising: a stiff material elongate member formed to an "S" shape having a rounded outer surface, said elongate member formed to an "S" shape having two opposite facing open "U" shaped loops that share a common joining side arm, a bottom portion in each "U" loop, an inner side arm and an outer side arm in each "U" loop substantially the same length as said common joining side arm; and a resilient tubular pad extending through most of the length of one of the "U" shaped loops of the bracket with the padded loops thereof extendable, respectively, through two windows of a four door car, through a window and over a side edge of a trunk, or a side window and the side edge of the bed of a truck; wherein said "U" shaped loops of the "S" shaped bracket are generally coplanar; said elongate member is a round metal extension formed to the bracket "S" shape; said adjustable cross bar mountable on extension of said common joining side arm below the end of said resilient tubular pad on said common joining side arm; and adjustable position mounting means mounting said cross bar on said extension of the common joining side arm.

2. The utility bracket of claim 1, wherein said adjustable position mounting means mounting said cross bar is adjustable to locked angled positions both horizontally and vertically to adapt to substantially any vehicle outer side contour to distribute weight laterally.

3. The utility bracket of claim 2, wherein said cross bar extends laterally to opposite sides from said "S" bracket.

4. The utility bracket of claim 3, wherein resilient tubular padding is mounted on said cross bar.

5. The utility bracket of claim 4, wherein said stiff material elongate member is a metal rod formed to bracket "S" shape.

6. The utility bracket of claim 4, wherein said stiff material elongate member is a metal round tube formed to the bracket "S" shape.

7. The utility bracket of claim 6, wherein said cross bar is formed from a round metal tube.

8. The utility bracket of claim 7, wherein said adjustable position mounting means mounting said cross bar on said extension of the common joining side arm mounts said cross bar to the side of said common joining side arm toward the vehicle the bracket is mounted on.

9. The utility bracket of claim 8, wherein said resilient tubular padding mounted on said cross bar is in two sections spaced at adjacent ends to accomodate said common joining side arm the cross bar is mounted on.

10. The utility bracket of claim 9, wherein said adjustable position mounting means mounting said cross bar on said extension of the common joining side arm includes, eccentric clip means having a half loop enclosing said common joining side arm; and bolt means extended through said cross bar and said eccentric clip for tightening said eccentric clip means and clamping said cross bar and said common joining side arm together.

11. The utility bracket of claim 10, wherein said bolt means includes a carriage bolt, with a winged nut, extended through a mounting base strap of said eccentric clip.

12. The utility bracket of claim 11, wherein one of the sections of said two sections of tubular padding mounted on said cross bar is provided with a cut out slit to clear said winged nut.

13. The utility bracket of claim 12, wherein an end cup pad of resilient material is mounted on each end of the bracket.

14. The utility bracket of claim 13, wherein an end cup pad of resilient material is mounted on each end of the cross bar.

* * * * *